United States Patent
Brugler et al.

(10) Patent No.: US 11,054,959 B2
(45) Date of Patent: Jul. 6, 2021

(54) CURSOR CONTROL

(71) Applicant: INTERNATIONAL BUSINESS MACHINES CORPORATION, Armonk, NY (US)

(72) Inventors: Thomas S. Brugler, Fuquay-Varina, NC (US); Randall A. Craig, Raleigh, NC (US); John F. Kelley, Polk City, FL (US); Jennifer M. Hatfield, San Francisco, CA (US); Corey Sonier, Baton Rouge, LA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/203,713

(22) Filed: Nov. 29, 2018

(65) Prior Publication Data

US 2020/0174626 A1 Jun. 4, 2020

(51) Int. Cl.
*G06F 3/0481* (2013.01)
*G06F 3/0486* (2013.01)

(52) U.S. Cl.
CPC .......... *G06F 3/0481* (2013.01); *G06F 3/0486* (2013.01)

(58) Field of Classification Search
CPC .............................. G06F 3/0481; G06F 3/0486
See application file for complete search history.

(56) References Cited

U.S. PATENT DOCUMENTS

| | | | |
|---|---|---|---|
| 4,977,397 A | 12/1990 | Kuo et al. | |
| 5,124,689 A * | 6/1992 | Franz | G05G 9/047 345/160 |
| 7,408,538 B2 | 8/2008 | Hinckley | |
| 9,910,512 B1 * | 3/2018 | Tiwary | G06F 3/0338 |
| 2003/0210286 A1 | 11/2003 | Gerpheide | |

(Continued)

FOREIGN PATENT DOCUMENTS

| | | |
|---|---|---|
| CN | 101482785 | 7/2009 |
| JP | 103349 | 1/1998 |

OTHER PUBLICATIONS

Brink, "Turn On or Off Mouse ClickLock in Windows", published: Mar. 23, 2018, Windows TenForums, https://www.tenforums.com/tutorials/106624-turn-off-mouse-clicklock-windows.html, https://web.archive.org/web/20190201193757/https://www.tenforums.com/tutorials/106624-turn-off-mouse-clicklock-windows.html (Year: 2018).*

*Primary Examiner* — Seth A Silverman
(74) *Attorney, Agent, or Firm* — Schmeiser, Olsen & Watts, LLP; William Hartwell

(57) ABSTRACT

A cursor control system and method are provided. The method may include receiving a first input from a cursor control device that places a cursor in an engaged state. The method may further include receiving an indication to switch from a gross cursor control mode to an engaged cursor control mode while the cursor is in the engaged state. The method may also include, in response to receiving the indication to switch from the gross cursor control mode to the engaged cursor control mode, switching from the gross cursor control mode to the engaged cursor control mode and locking the cursor in the engaged state such that the cursor maintains the engaged state even after the first input from the cursor control device has terminated. The method may additionally include, in response to receiving a second input, performing an operation on a screen object the engaged cursor control mode.

17 Claims, 13 Drawing Sheets

(56) References Cited

U.S. PATENT DOCUMENTS

| | | |
|---|---|---|
| 2008/0174567 A1 | 7/2008 | Woolley |
| 2009/0201248 A1* | 8/2009 | Negulescu .............. G06F 3/016 345/157 |
| 2011/0141052 A1 | 6/2011 | Bernstein et al. |
| 2013/0055126 A1* | 2/2013 | Jackson .............. G06F 3/04845 715/769 |
| 2014/0300543 A1 | 10/2014 | Kim |
| 2018/0181272 A1 | 6/2018 | Olsson |

* cited by examiner

CURSOR CONTROL

BACKGROUND

The present disclosure relates to systems and methods for cursor control, and more specifically to modes for controlling a cursor.

Cursor control devices such as trackpads and track balls have been incorporated into laptops since they were first introduced. Trackpads may allow a user the ability to move the cursor's location by moving her/his finger across the trackpad. Users may abandon the trackpad in favor of other cursor control devices when an application requires pixel-level cursor placement. The size of a user's finger in relation to the size of the trackpad may impede discrete or finite pixel-level movement. Further, after positioning the user's finger at the desired location, simply lifting the finger off the trackpad can unintentionally move the cursor off the desired location. Both the finger/trackpad's respective sizes and unintentional finger movement may provide a poor user experience when using the trackpad to move, size, or drag-and-drop objects or icons or with applications that require pixel-level cursor positioning.

For example, the trackpad's fixed surface area may be another factor that can lead to a poor user experience. A user may become frustrated when the user discovers that she/he has a finger at the edge of the trackpad and there may not be enough surface area left to complete the drag-and-drop, sizing, or moving operation. In such situations, the user may be forced to abandon the operation, and start again. The user must then reposition her/his finger to allow for greater distance from the starting point to the edge of the trackpad.

SUMMARY

Embodiments of the present disclosure relate to a method, and associated computer system and computer program product, for controlling a cursor. The method may include receiving a first input from a cursor control device that places a cursor in an engaged state. The method may further include receiving an indication to switch from a gross cursor control mode to an engaged cursor control mode while the cursor is in the engaged state. The method may also include, in response to receiving the indication to switch from the gross cursor control mode to the engaged cursor control mode, switching from the gross cursor control mode to the engaged cursor control mode and locking the cursor in the engaged state such that the cursor maintains the engaged state even after the first input from the cursor control device has terminated. The method may additionally include, in response to receiving a second input, performing an operation on a screen object while in the engaged cursor control mode and while the cursor is locked in the engaged state even after the first input from the cursor control device has terminated.

In an implementation, the method may include, in response to receiving the second input, moving the cursor at a more granular rate while in the engaged cursor control mode and while the cursor is locked in the engaged state than the cursor would move while in the gross cursor control mode. The method may further include in response to receiving a third input, switching from the engaged cursor control mode to the gross cursor control mode and unlocking the cursor from the engaged state.

One or more of the following features may be included. The more granular rate may be user-configurable. Moving the cursor at the more granular rate in response to receiving the second input may further include performing, at least in part, at least one of: a drag and drop operation, a scaling operation, a move operation, a highlight operation, a select operation, or a draw operation. The cursor control device may be selected from the group consisting of: a track ball, a track pad, a stylus, a mouse, a pointer device, and an eye tracking device. A click operation may initiate the first input that places the cursor in the engaged state and, when in the engaged cursor control mode, the cursor may remain in the engaged state even when the click operation has terminated.

DETAILED DESCRIPTION

Figure 1:
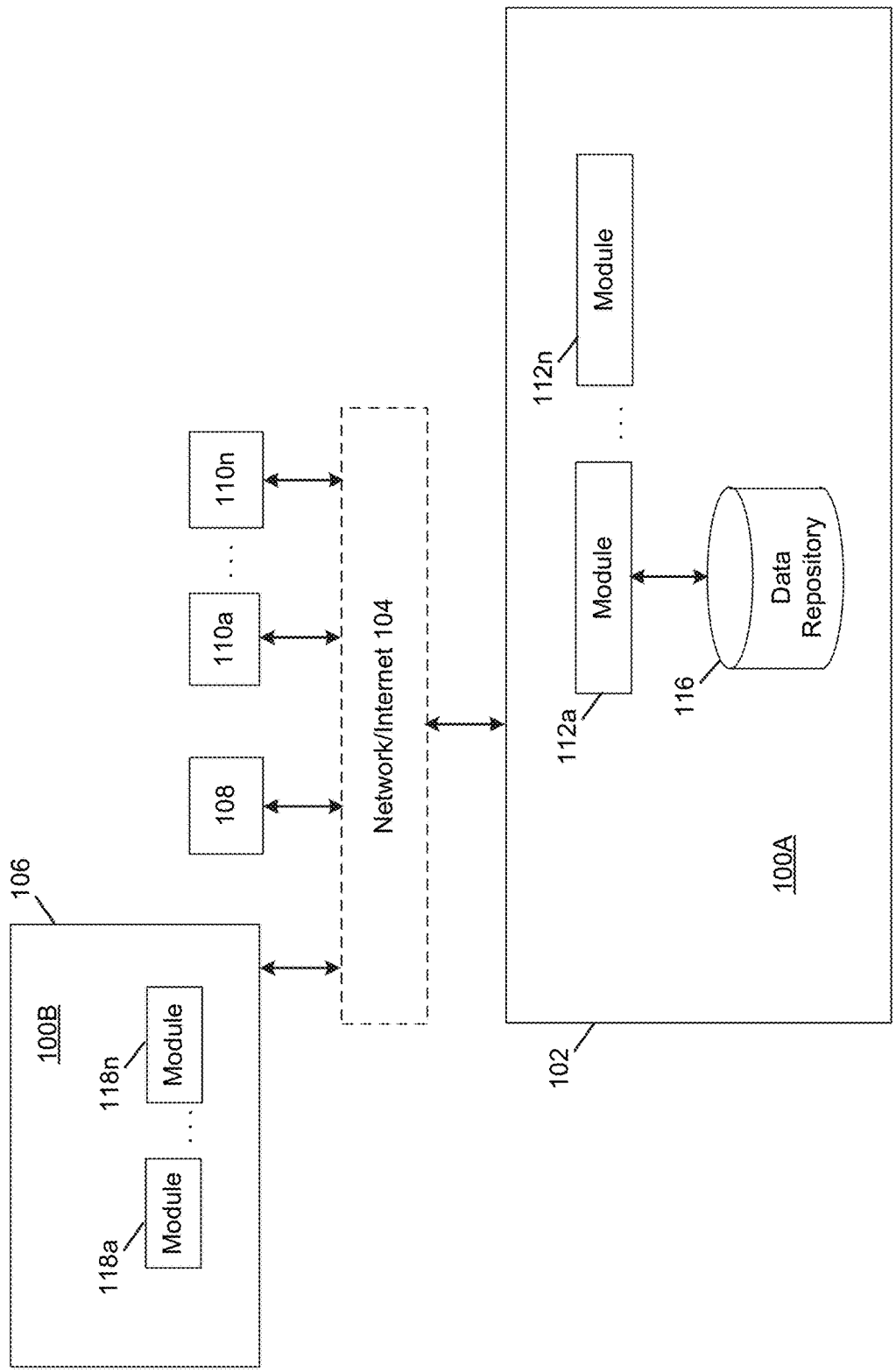
FIG. 1 depicts a block diagram of one or more example cursor control systems, in accordance with embodiments of the present disclosure.

Poor cursor control device experience may lead to unintentional actions such as unintentional dropping of a file, object, or icon, during a drag-and-drop process. This may lead to undesired consequences such as unintentional initiation of a file download or similar. Various solutions for poor cursor control device experience (e.g., such as with trackpads or trackball s) have been attempted.

For example, one solution for finger/trackpad size and unintentional finger movement issues has been to increase sensitivity of the trackpad, however this may cause systematic loss of positioning resolution. Thus, there may be a gap between user-experience with current cursor control options and with the user-experience desired for cursor control devices such as track pads. Further, there may be a gap between rough cursor control with human hands and fingers and a finer cursor control that may improve system or application use and/or capability. Accordingly, there may be a need to improve user-experience with cursor control devices such as trackpads.

The present disclosure may address inherent limitations of and issues with user-experience with cursor control devices such as trackpads including, but not limited to, discrete pixel movement for the cursor and drag-and-drop/moving/sizing operations. For example, a trackpad locking feature may be provided. Once the locking feature is set, the cursor's position may be temporarily fixed. By locking the cursor's position, subtle finger movement maybe prevented from introducing incidental cursor drift. The cursor locking mechanism or feature may also allow a user to reposition his/her finger and resume a drag-and-drop operation without starting over (i.e., reselecting the object or icon). Further, an implementation of the locking feature may provide more granular cursor movement including pixel-level (or smaller)

cursor positioning. The pixel-level movement may overcome the difficulty of, for example, using a trackpad to position the cursor at exact or more exact XY coordinates. Thus, using the techniques and features described in the present disclosure, a cursor control method may be implemented to improve user-experiences with cursor control devices including trackpads.

In an embodiment, a method or process for cursor control may include receiving a first input from a cursor control device that places a cursor in an engaged state. The method may further include receiving an indication to switch from a gross cursor control mode to an engaged cursor control mode while the cursor is in the engaged state. The method may also include, in response to receiving the indication to switch from the gross cursor control mode to the engaged cursor control mode, switching from the gross cursor control mode to the engaged cursor control mode and locking the cursor in the engaged state such that the cursor maintains the engaged state even after the first input from the cursor control device has terminated. The method may additionally include, in response to receiving a second input, performing an operation on a screen object while in the engaged cursor control mode and while the cursor is locked in the engaged state even after the first input from the cursor control device has terminated.

Referring to the drawings, FIG. 1 depicts a block diagram of cursor control system 100A in a server 102, in accordance with embodiments of the present disclosure. Embodiments of the cursor control system 100A may allow for controlling a cursor associated with the server 102. The various computer systems shown in FIG. 1, including the server, may be similar to and/or include similar components to the computer system of FIG. 5.

Server 102 may be in communication with a network 104 and/or the Internet through which server 102 may communicate with various other computer systems and machines. For example, server 102 may communicate with client devices 106, 108, and various user computer systems 110a . . . 110n which may also include cursor control systems such as cursor control system 100B of client device 106.

Cursor control system 100A may include one or more modules 112a-112n, in accordance with embodiments of the present disclosure. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the server 102. A module (whether hardware, software, or a combination thereof) may be designed to implement or execute one or more particular functions, routines, or operations, such as those shown in the blocks of FIG. 2. Similarly, cursor control system 100B of client device 106 may include modules 118a-118n.

In an example, embodiments of the modules 118a-118n may include one or more components of hardware and/or software program code for implementing or executing one or more particular functions, routines, or operations, such as those shown in blocks 202-212 of FIG. 2 and described below. Similarly, embodiments of the modules 112a-112n may include one or more components of hardware and/or software program code for implementing or executing one or more particular functions, routines, or operations, such as those shown in blocks 202-212 of FIG. 2 and described below.

Figure 2:
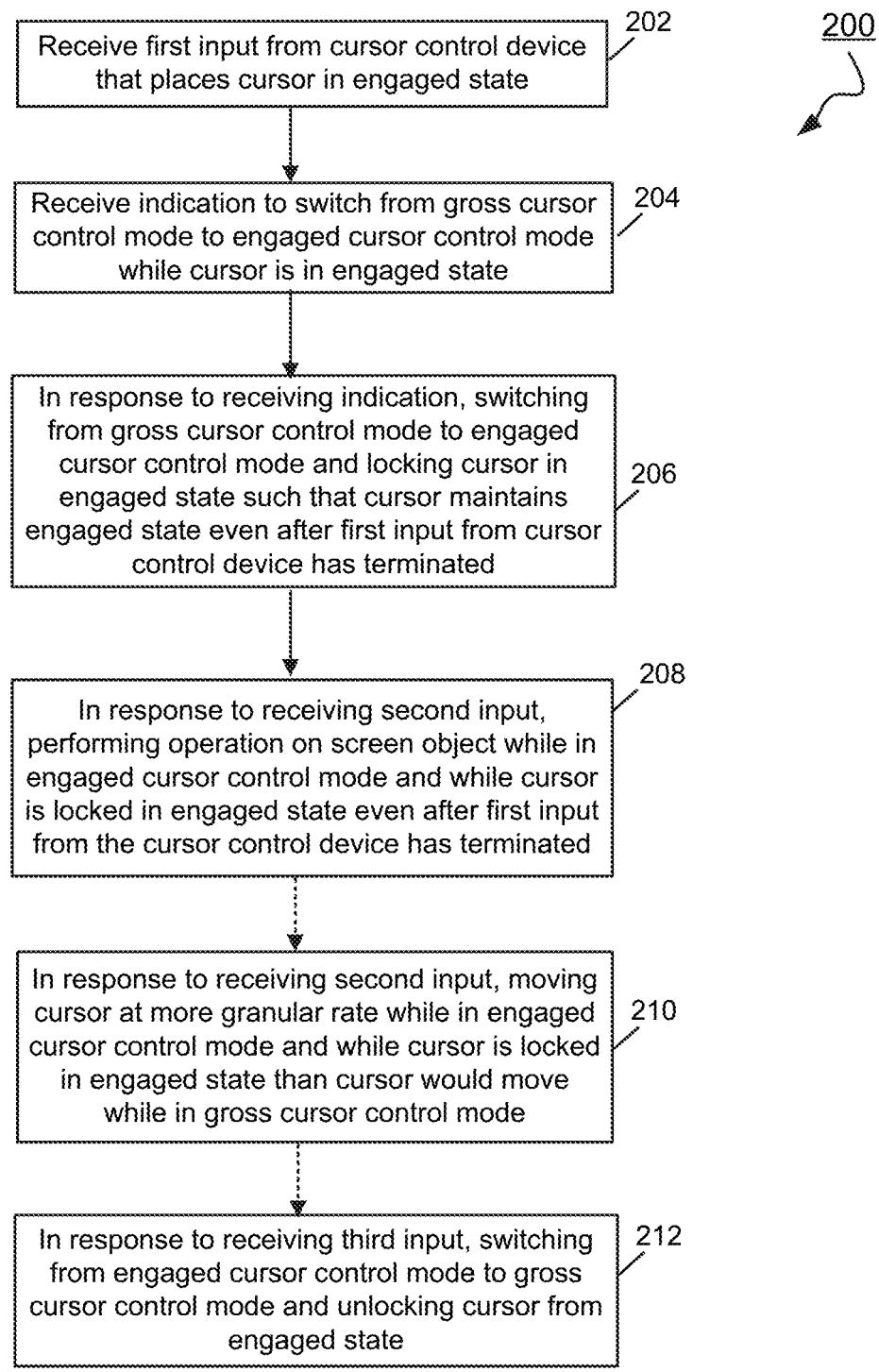
FIG. 2 depicts a flow chart of a method for cursor control, in accordance with embodiments of the present disclosure.

Referring now to FIG. 2, a flow chart of a method or process 200 for controlling a cursor, in accordance with embodiments of the present disclosure, is shown. In an embodiment, a process 200 or algorithm may be implemented for cursor control and may run on or be executed by server 102 described in FIG. 1 or by one or more computer systems as defined generically in FIG. 5. Further, process 200 may be part of or may use portions of modules 112a-112n of FIG. 1. In an embodiment, a process 200 or algorithm may be implemented for cursor control and may run on or be executed by client device 106 described in FIG. 1 or by one or more computer systems as defined generically in FIG. 5. Further, process 200 may be part of or may use portions of modules 118a-118n of FIG. 1.

Figure 3:
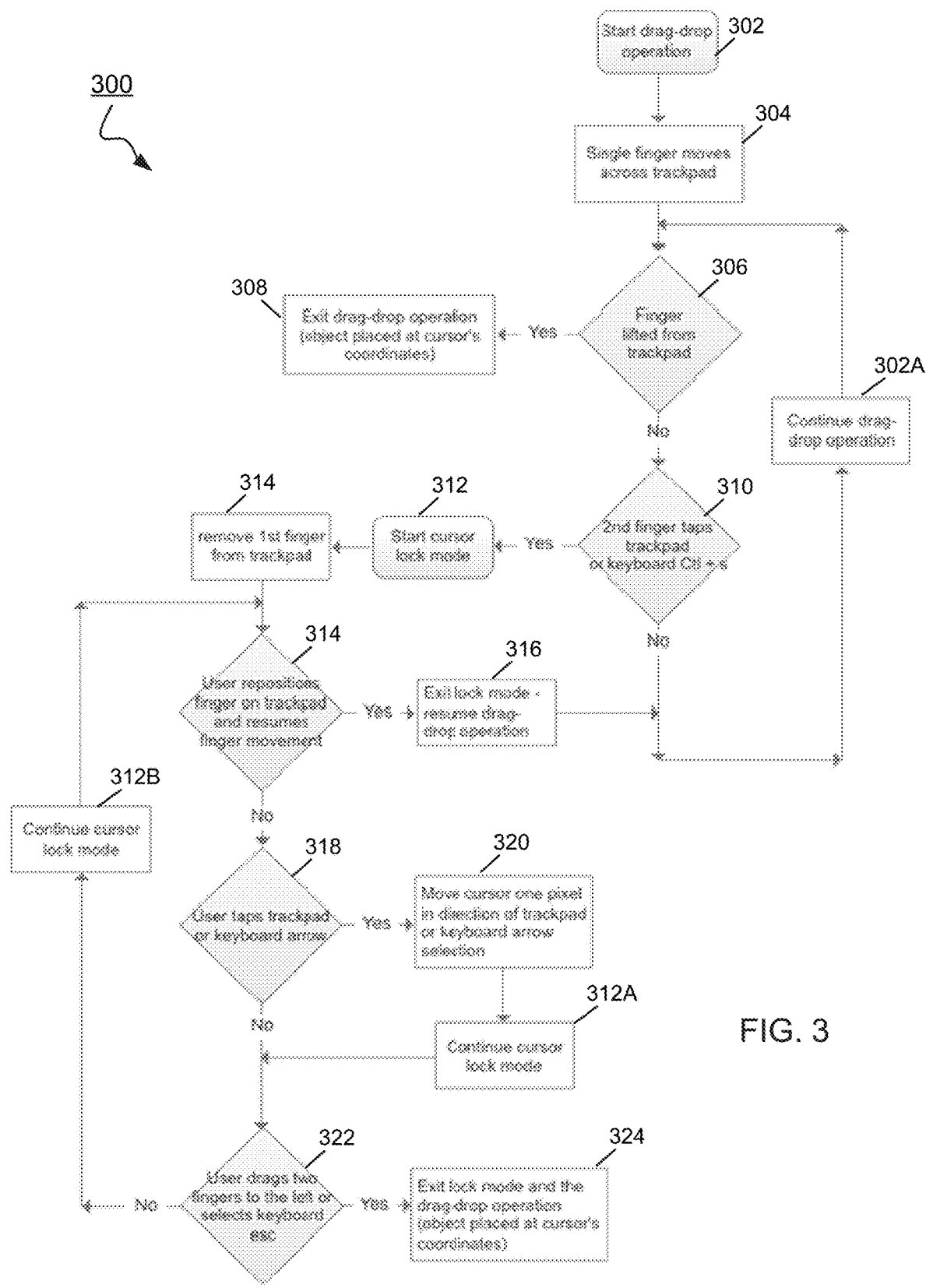
FIG. 3 depicts a diagrammatic flow chart illustrating example cursor control operations, in accordance with embodiments of the present disclosure.

Cursor control methods and systems as described herein may include multiple cursor control modes and a locking feature which may lock a cursor in place. Switching from one cursor control mode to another or initiating the locking feature may include using a trackpad gesture (e.g., a chord pattern) or using a keyboard (e.g., pressing a combination of keys). Referring now also to FIG. 3, a step by step process 300 for cursor control including user operations is shown. At step 302, a drag-drop (i.e., drag-and-drop) operation may be started.

Figure 4A:
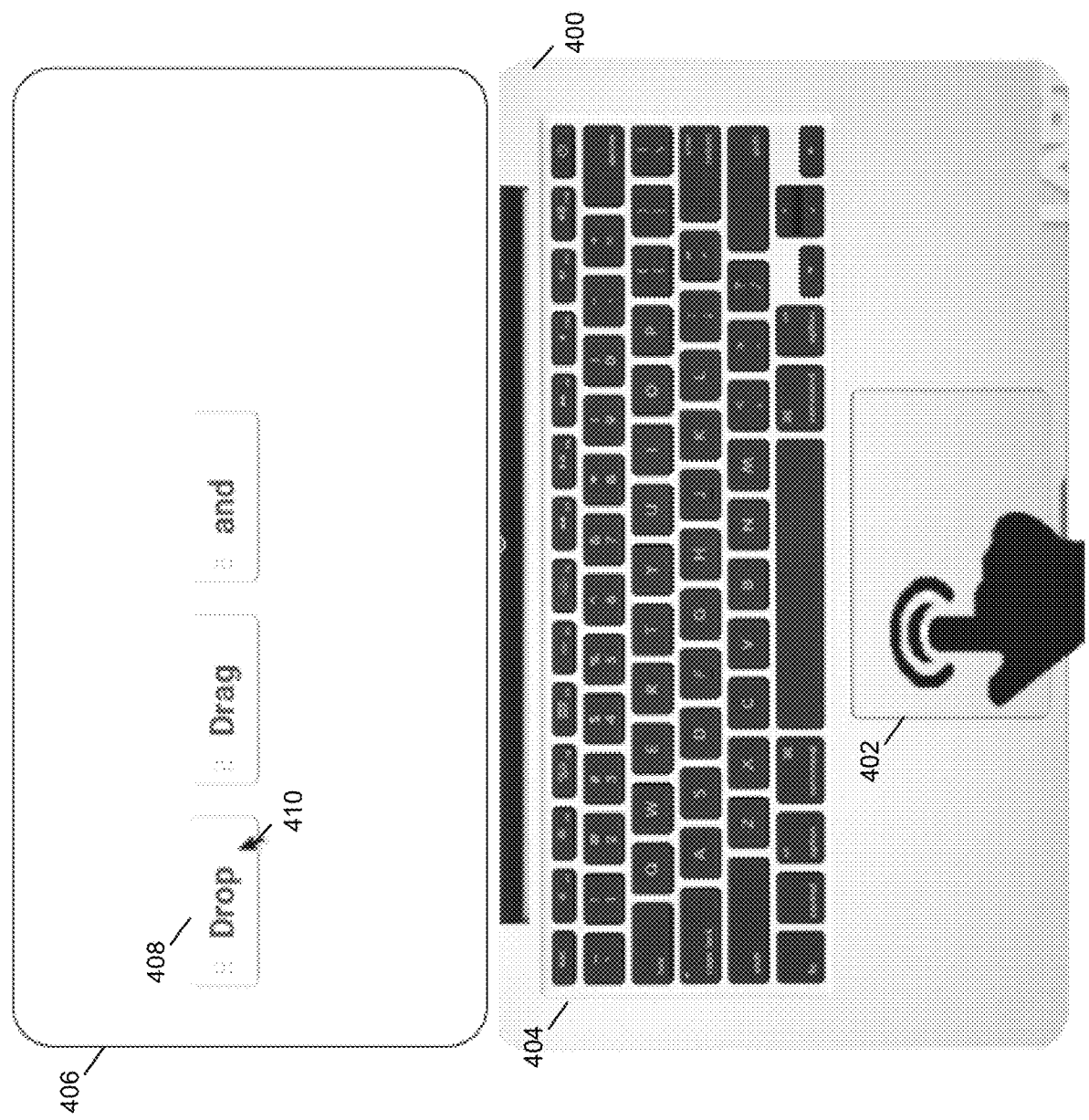
FIGS. 4A-4G depict examples of cursor control, in accordance with embodiments of the present disclosure.

Referring now also to FIG. 4A, a client device 400 is shown. Client device 400 may be similar to client device 106 and may be similar to and/or include similar components to the computer system of FIG. 5. Client device 400 may run or execute process 200 and may be used to implement step by step process 300 for cursor control. For example, a user may use trackpad 402 to start a drag-and-drop operation as in step 302 by selecting an object 408 on screen 406 using trackpad 402. For example, the user may position cursor or pointer 410 on object 408 (e.g., an icon or file) and press, click, tap, or otherwise engage the trackpad 402. Referring back to FIG. 2, in this way, process 200 may receive 202 a first input (e.g., in response to the engagement of the trackpad) from a cursor control device (e.g., trackpad 402) that places a cursor (e.g., cursor 410) in an engaged state.

Figure 4B:
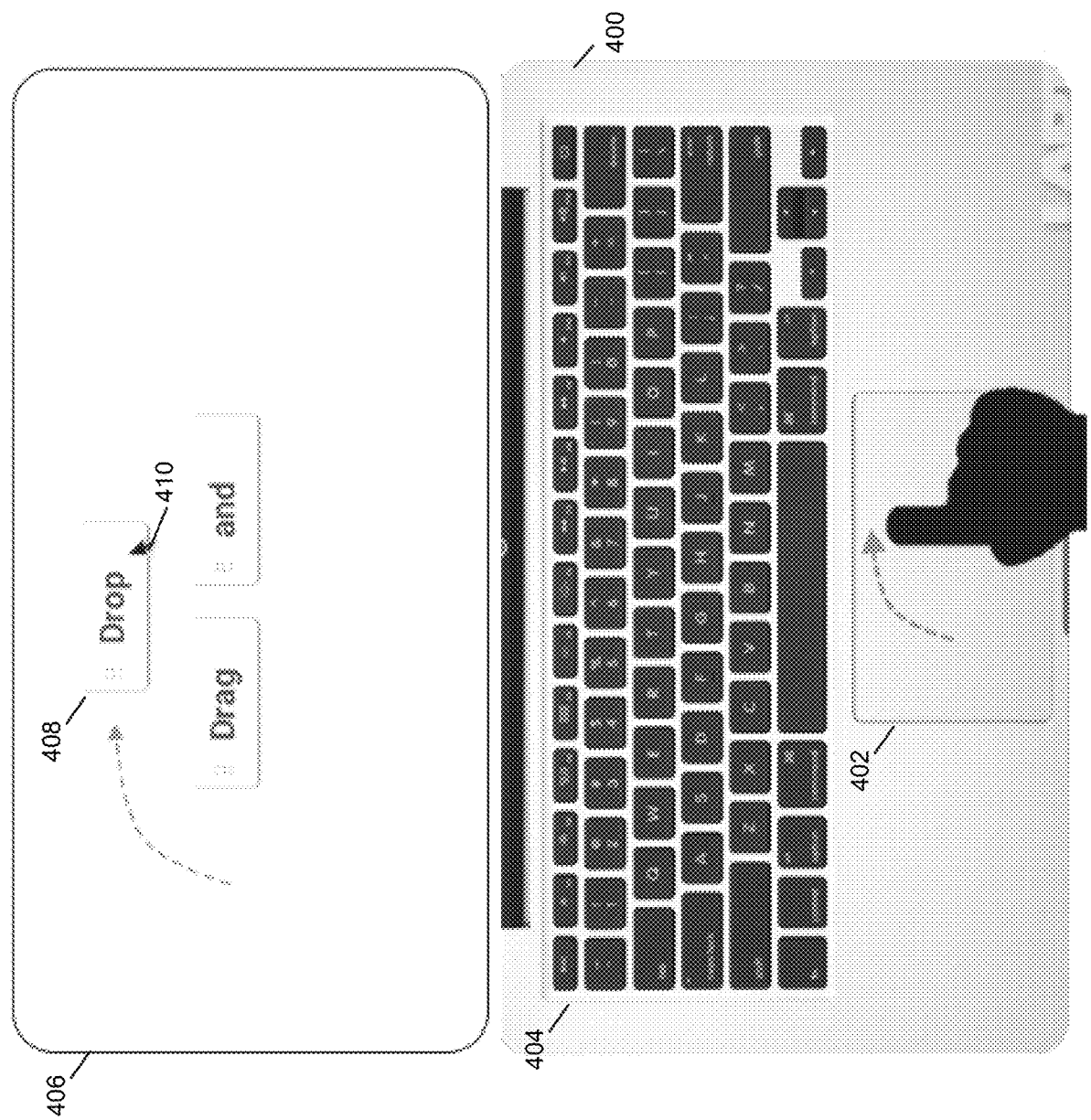

The user may then initiate a drag operation. For example, at step 304, the user may move a single finger across trackpad 402, as shown in FIG. 4B. As a result, object 408 may move across screen 406 with cursor 410 engaged on object 408 as the user moves his/her finger across trackpad 402 and as the user continues the drag-and drop operation as in step 302A of FIG. 3.

At this point, the user may choose to exit the drag-and-drop operation at step 308 by lifting his/her finger from the trackpad 402 at step 306. Object 408 may then be left in the position shown in FIG. 4B on screen 406. Alternatively, the user may lift his/her finger from trackpad 402 by accident and thus exit the drag-and-drop operation by accident, which may be undesirable and lead to a negative user-experience.

Figure 4C:
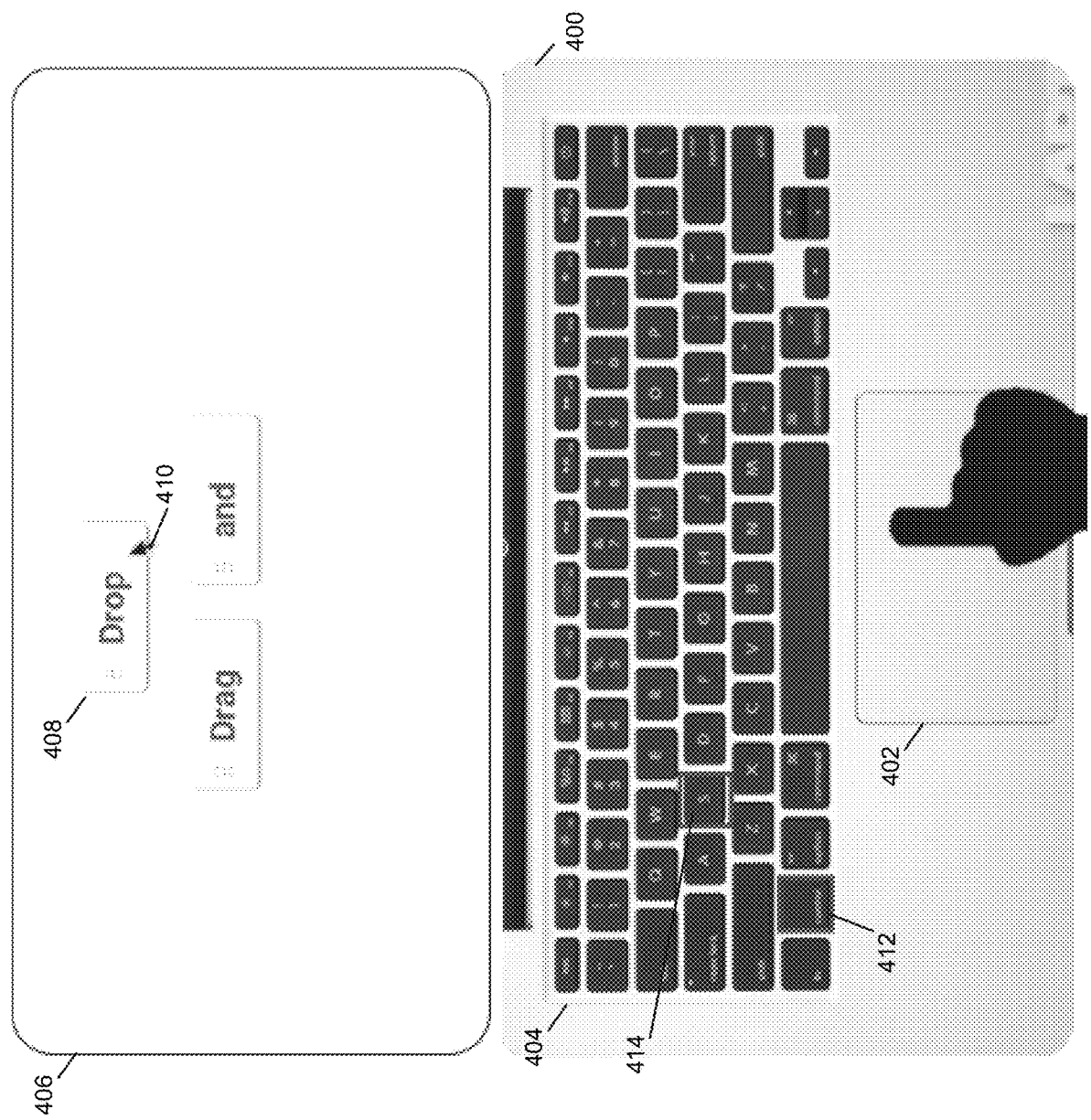

However, using the techniques and features described in the present disclosure, the user may initiate another cursor control mode and/or locking mode or feature to achieve a more positive user-experience and more easily use the drag-and-drop feature. For example, the user may perform a gesture on the trackpad, tap a second finger on the trackpad, or press the control key and "s" key on the keyboard at the same time as in step 310 of FIG. 3. As shown in FIG. 4C, the user may press the boxed control key 412 and "s" key 414 on the keyboard 404 at the same time. This may start a cursor lock mode as in step 312 of FIG. 3. It should be noted that tapping a second finger on the trackpad or pressing the control key and "s" key on the keyboard at the same time to initiate the other cursor control mode and/or locking mode are provided for illustrative purposes only and other keyboard or trackpad inputs for initiating the cursor control mode or locking mode may be used.

Referring back to FIG. 2, in this way, process 200 may receive 204 an indication (e.g., in response to the user pressing control key 412 and "s" key 414 on the keyboard) to switch from a gross cursor control mode to an engaged cursor control mode while the cursor (e.g., cursor 410) is in the engaged state. As used herein, the term "gross cursor control mode" may refer to standard control of the cursor as would be usual in an operating system of, e.g., client device 400. Further, as used herein, the term "engaged cursor control mode" may refer to enhanced control of the cursor once the user has decided to initiate the locking of the cursor in the engaged position. Process 200 may then, in response to receiving the indication (e.g., from the user pressing control key 412 and "s" key 414 on the keyboard) to switch from the gross cursor control mode to the engaged cursor control mode, switch 206 from the gross cursor control mode to the engaged cursor control mode and lock the cursor (e.g., cursor 410) in the engaged state such that the cursor maintains the engaged state even after the first input from the cursor control device (e.g., trackpad 402) has terminated.

It should be noted that while trackpads are discussed as cursor control devices in various examples used in the present disclosure, this is for illustrative purposes only, as other cursor control devices may be used to achieve the techniques and features described herein. For example, the cursor control device may be one or more of a track ball, a track pad, a stylus, a mouse, a pointer device, and an eye tracking device. In the case of a mouse, for example, a click operation may initiate the first input that places the cursor in the engaged state and, when in the engaged cursor control mode, the cursor may remain in the engaged state even when the click operation has terminated (i.e., the finger has been lifted from the mouse button).

Figure 4D:
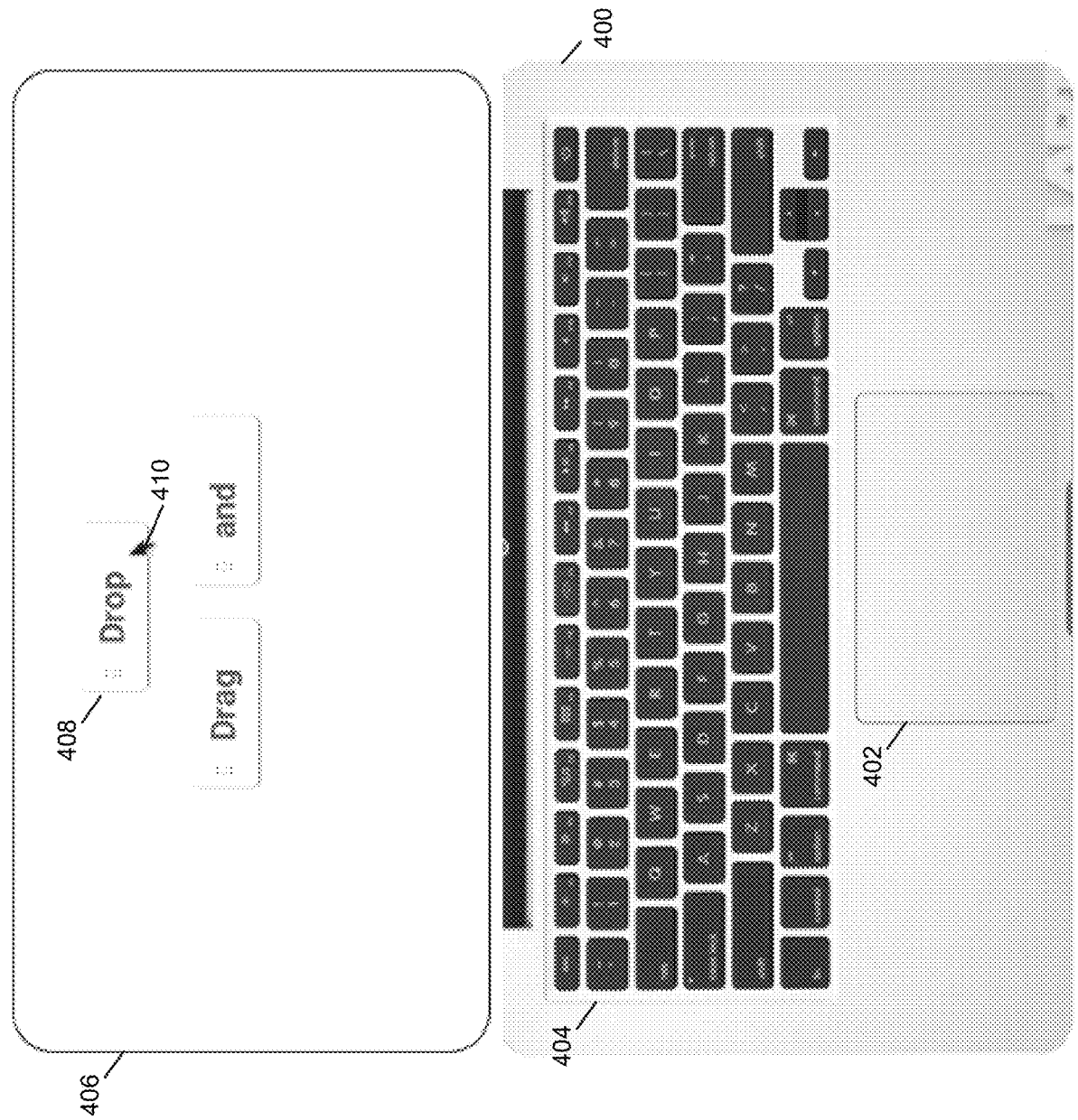

Referring now also to FIG. 4D, the user may remove his/her finger from trackpad 402 as in step 314. As a result of the switch to engaged cursor control mode, the cursor 410 may remain engaged on object 408 (i.e., in the engaged state) even after the first input (e.g., the user's initial clicking or tapping on object 408) from the trackpad 402 has terminated (e.g., the user has removed his/her finger from trackpad 402).

Figure 4E:
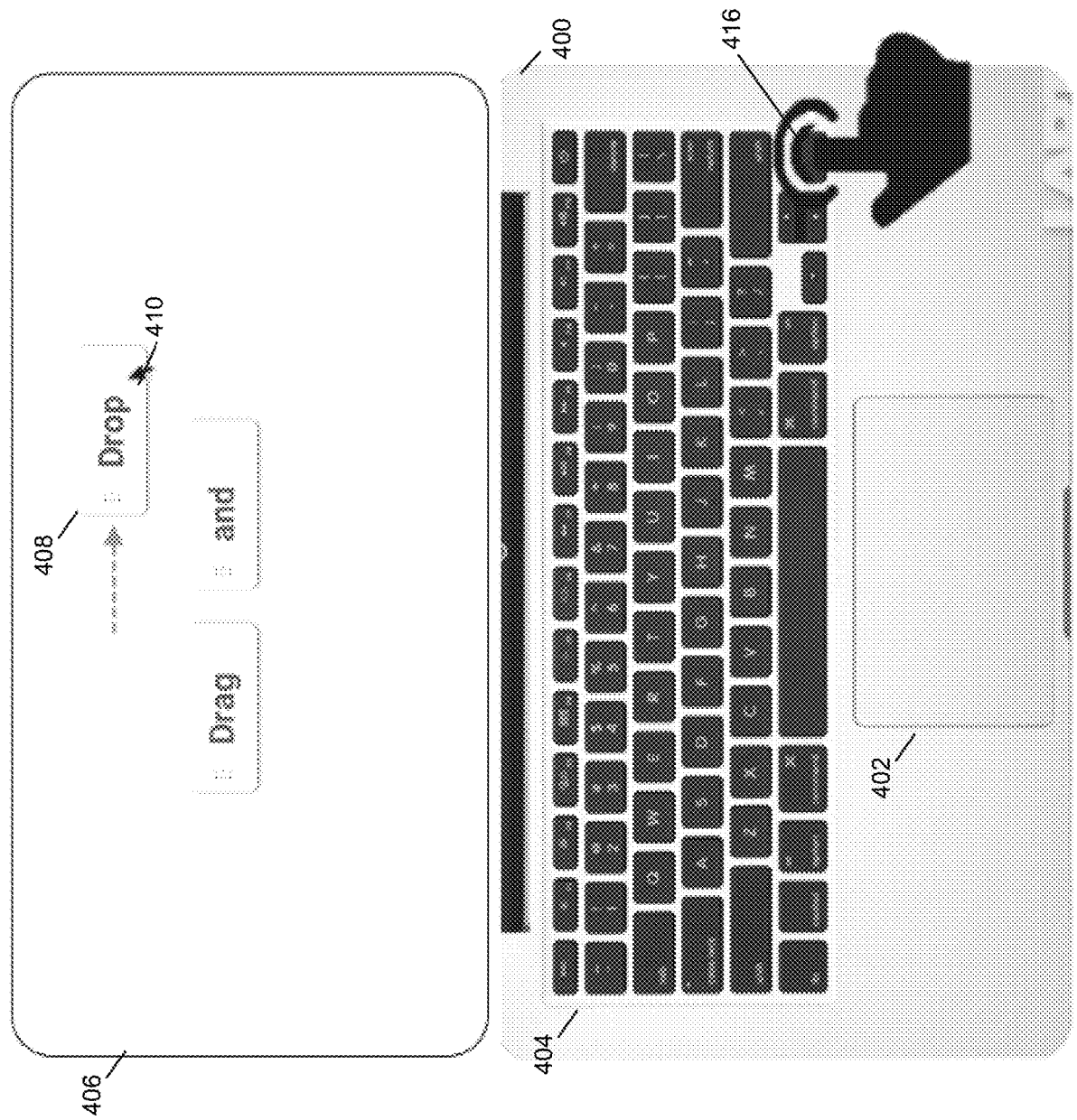

The user may now proceed with taking action on object 408 even though the user has removed his/her finger from trackpad 402 because the cursor remains engaged on object 408. For example, the user may tap the trackpad or, as shown in FIG. 4E, press right arrow key 416 to move object 408 to the right at, for example, a more granular rate (e.g., pixel by pixel, as shown in step 320) as compared to when in the gross cursor control mode. Any of the arrow keys may be used to move object 408 in other respective directions and/or a portion of the trackpad may be tapped (e.g., a portion on the right of the trackpad) to move object 408 one pixel.

In an embodiment, in response to receiving a second input (e.g., repositioning a finger on the trackpad and resuming finger movement as in step 314), process 200 may perform 208 an operation on a screen object (e.g., object 408) while in the engaged cursor control mode and while the cursor (e.g., cursor 410) is locked in the engaged state, even after the first input (e.g., the user's initial clicking or tapping on object 408) from the cursor control device has terminated. This operation may simply be to further drag the screen object (e.g., object 408) from its position when the cursor was locked to another area because the user ran out of space on the touchpad and could not perform the fully desired dragging of the object initially. The operation may result in automatically exiting the engaged cursor control mode (e.g., lock mode) as in step 316.

The operation may alternatively be to drag the screen object (e.g., object 408) pixel by pixel. For example, in an implementation, in response to receiving the second input (e.g., tapping a portion of the trackpad or pressing the right arrow key 416), process 200 may move 210 the cursor (e.g., cursor 410) at a more granular rate (e.g., pixel by pixel) while in the engaged cursor control mode and while the cursor (e.g., cursor 410) is locked in the engaged state, than the cursor would move while in the gross cursor control mode. Moving the cursor at the more granular rate in response to receiving the second input may further include performing one or more of the following operations: a drag and drop operation, a scaling operation, a move operation, a highlight operation, a select operation, or a draw operation.

In an implementation, the more granular rate (e.g., pixel by pixel) may be user-configurable. For example an arrow key may be configured to move or drag the object more than one pixel (e.g., 2 pixels, 5 pixels, etc.) in the corresponding direction each time it is pressed. Further, XY coordinates of the screen may be provided by the user such that the object can be moved or dragged to an exact location. The object may be moved or dragged at distances smaller than a pixel if desired.

Figure 4F:
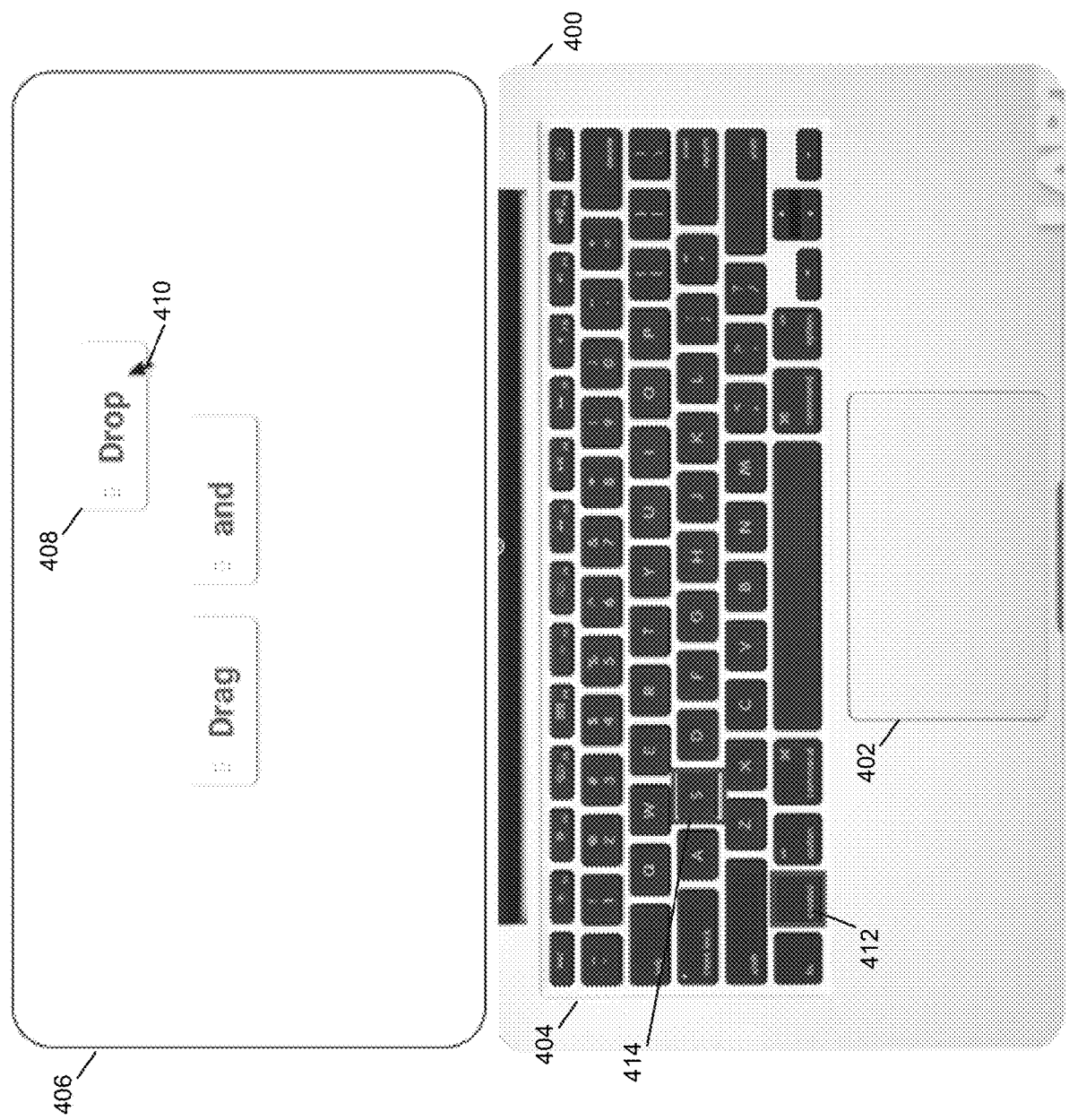
Figure 4G:
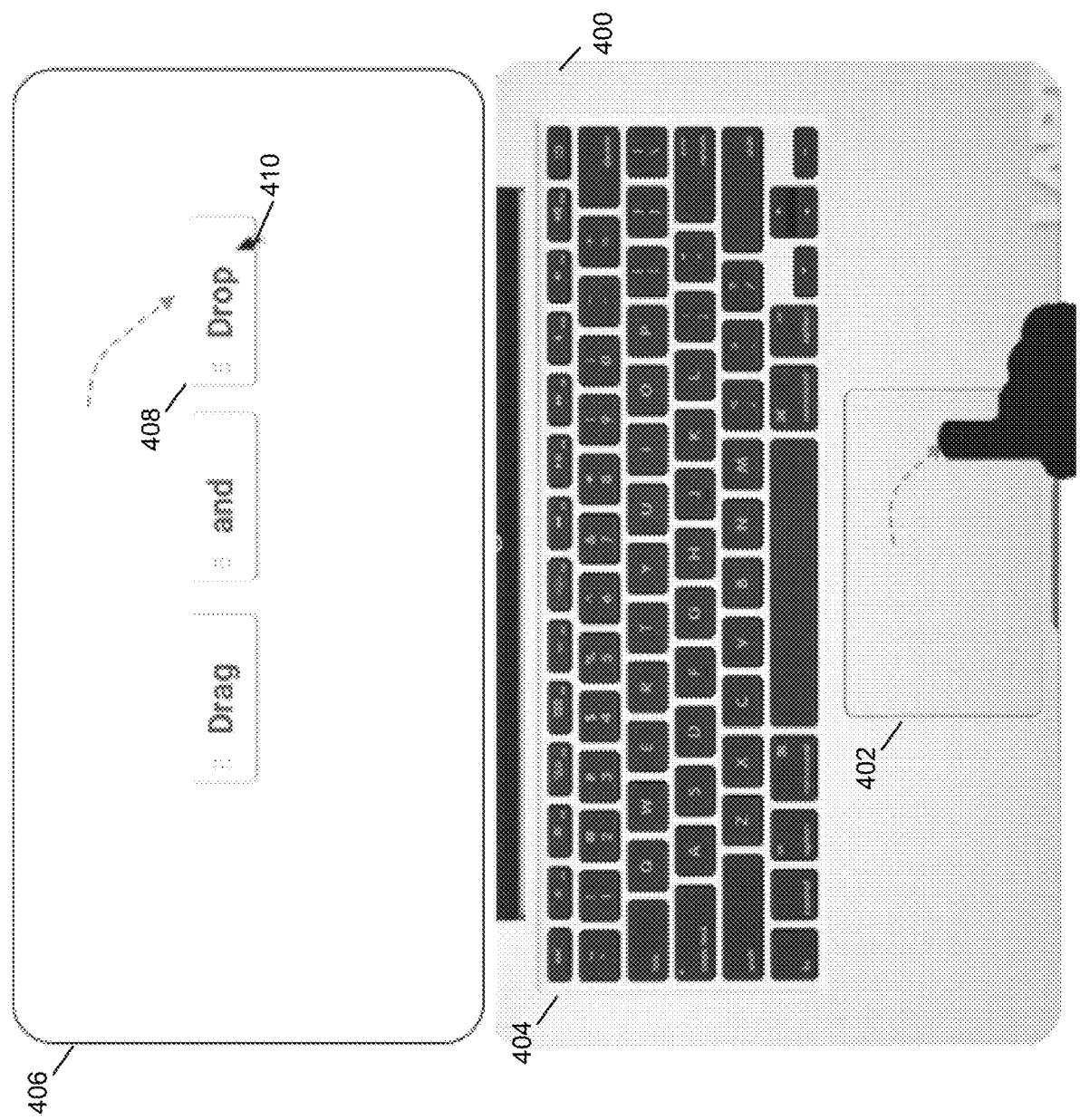

The user may continue to operate in the engaged cursor control mode (or, e.g., cursor lock mode as shown in steps 312A and 312B of FIG. 3) with the keyboard arrow keys or by tapping portions of the touch pad to take action on object 408. In an embodiment, activation of the engaged cursor control mode (or, e.g., cursor locking mode) may also lock the trackpad such that only the keyboard (e.g., via the arrows) may be used to take action on the screen object (e.g., object 408). The user may wish to unlock the track pad and but continue to have the cursor locked on the object 408. Referring now to FIG. 4F, the user may press control key 412 and "s" key 414 on the keyboard to unlock the trackpad but remain in the engaged cursor control mode with the cursor locked on the object 408. Referring now to FIG. 4G, the user may continue to operate on object 408 using the trackpad without starting the entire drag-and-drop process over again.

The benefit of resuming the operation in this way may be that the user need not reselect the object and start finger movement from the beginning. To illustrate, assume that a resizing operation of a screen object requires 4 inches of finger movement and that during the initial finger movement, the user reached the edge of the trackpad after traveling 3 inches. After initiating the engaged cursor control mode (e.g., cursor locking mode), the user would only need to reposition her/his finger on the trackpad and resume moving her/his finger 1 inch to complete the desired resizing operation The user may also wish to end the engaged cursor control mode and resume entirely in gross cursor control mode. The user may take various actions to end the engaged cursor control mode such as dragging two fingers to the left on the trackpad or pressing the "esc" key on the keyboard, as shown in step 322 of FIG. 3. As a result, the engaged cursor control mode (e.g., cursor locking mode) and the drag-and-drop operation may be exited with the object (e.g., object 408) being placed at the XY coordinates of the cursor as shown in step 324 of FIG. 3. In this way, process 200 may, in response to receiving a third input (e.g., from dragging two fingers to the left on the trackpad or pressing the "esc" key on the keyboard), switch 212 from the engaged cursor control mode to the gross cursor control mode and unlock the cursor (e.g., cursor 410) from the engaged state.

It should be noted that the user may exit the engaged cursor control mode or the locking mechanism without taking action on the screen object engaged. For example, the user may have initiated the engaged cursor control mode or locking mechanism by mistake or he/she may be satisfied with the cursor's current location. In either case, the user may exit the engaged cursor control mode or the locking mechanism by selecting, e.g., the "esc" key or using, for example, a preconfigured trackpad gesture.

In various implementations, an architecture of a driver of a cursor control device may be used to achieve the techniques and features described here. The driver may be software which communicates with the operating system (OS), and through the OS communicates with a specific the application being run. The application may have an application program interface (API) which receives XY coordinates of a cursor position from the OS, which receives the XY coordinates from the cursor control device driver. Thus, the cursor control device driver may send XY coordinates from the cursor control device to the OS and from there to the application running. Once engaged cursor control mode or locking mode has been entered, the cursor control device driver may intercept the engaged cursor control mode (e.g., cursor position) without the OS being affected, and can constrain or control pixels or XY coordinates sent through the OS to the application running. The application running may use the XY coordinate location of the cursor to move the screen object or take action, as described above. In this way, while the switching of the mode of input from gross cursor control mode to engaged cursor control mode has been made, the system is still providing XY coordinates at the application level. For example, to invoke the cursor locking mode, a call may be sent to the system level API which may capture the XY coordinates of the current cursor position. Those XY coordinates may then be edited based on what the user entered or indicated with the arrows keys (for example) to perform the desired operation on the screen object.

In an implementation, a user initiates a drag-and-drop operation by performing an input action (e.g., touchpad tap and drag) on the cursor control device. The user may then perform the necessary action to trigger a state change in the cursor control device driver (e.g., gesture, keyboard shortcut, etc.). This action may communicate to the cursor control device driver that the accepted input method (e.g., engaged cursor control mode) is now the method to support discrete pixel movement, and current trackpad movement is suspended or locked, allowing the user to lift his/her finger up without any movement in cursor position. The drag-and-drop operation is not interrupted during this state change. After the state change is complete, the engaged cursor control mode may default to, for example, keyboard directional inputs from the up, down, left, and right arrow keys. The engaged cursor control mode may move the cursor one pixel in a direction corresponding to the user action with the keyboard arrows. The user may then trigger a cursor control device driver change event to switch back to the gross cursor control mode by performing the same action (e.g., gesture, keyboard shortcut, etc.) used to enter the engaged cursor control mode.

Using the techniques and features described in the present disclosure, a technical solution to the technical problem of negative user-experience with cursor control devices may be realized by executing methods or processes for controlling a cursor as described herein and more granular control of the cursor may be achieved. This may be especially useful in applications used to create or edit graphics.

Figure 5:
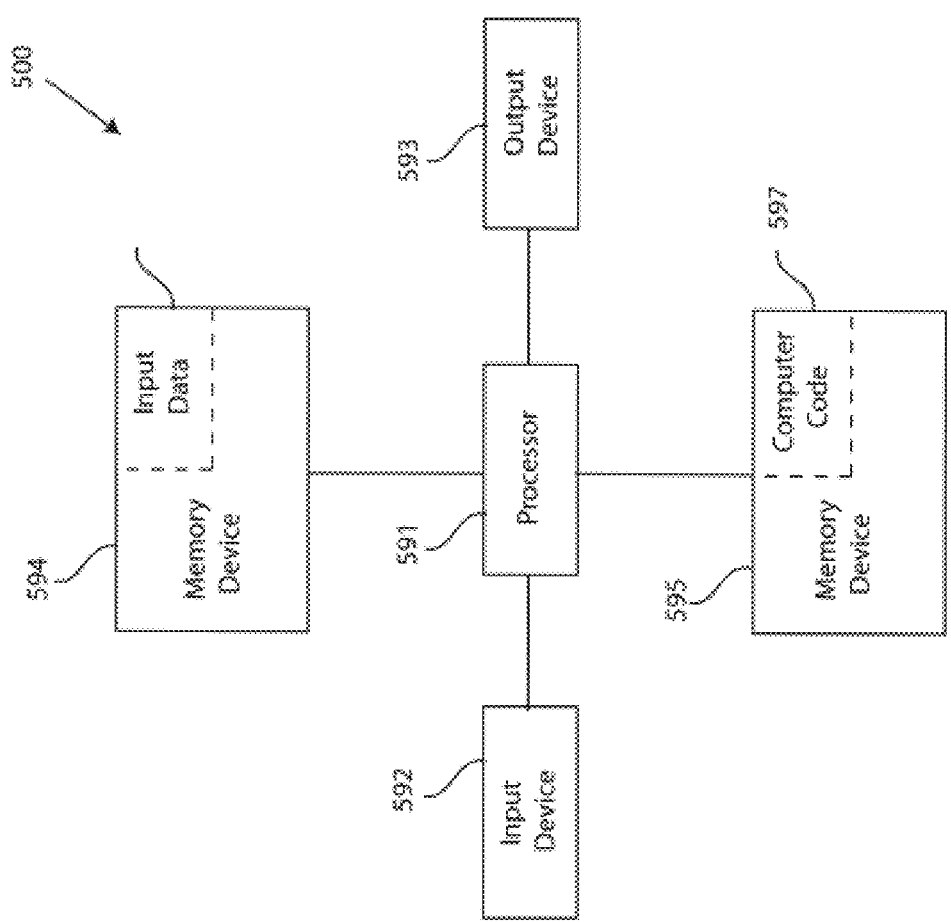
FIG. 5 illustrates a block diagram of a computer system for cursor control capable of implementing the method for cursor control of FIG. 2, in accordance with embodiments of the present disclosure.

FIG. 5 illustrates a block diagram of a computer system 500 that may be included in the system (e.g., as client device 106 or server 102) of FIG. 1 and for implementing the method or process of FIG. 2 in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method or process for controlling a cursor, in the manner prescribed by FIG. 2, wherein the instructions of the computer code 597 may be executed by processor 591 via memory device 595. The computer code 597 may include software or program instructions that may implement one or more algorithms for implementing the method or process for controlling a cursor, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the sensors 110. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 116 as shown in FIG. 1.

As will be appreciated by one skilled in the art, in a first embodiment, the present disclosure may describe a method; in a second embodiment, the present disclosure may describe a system; and in a third embodiment, the present disclosure may describe a computer program product. Any of the components of the embodiments of the present disclosure can be deployed, managed, serviced, etc. by a service provider that offers to deploy or integrate computing infrastructure with respect to cursor control systems and methods. Thus, an embodiment of the present disclosure is a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to control a cursor. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method or process for controlling a cursor. Thus, the present disclosure describes a process for supporting, deploying and/or integrating computer infrastructure, integrating, hosting, maintaining, and deploying computer-readable code into the computer system 500, wherein the code in combination with the computer system 500 is capable of performing a method or process for controlling a cursor.

A computer program product of the present disclosure comprises one or more computer readable hardware storage devices having computer readable program code stored therein, said program code containing instructions executable by one or more processors of a computer system to implement the methods or processes of the present disclosure.

A computer system of the present disclosure comprises one or more processors, one or more memories, and one or more computer readable hardware storage devices, said one or more hardware storage devices containing program code executable by the one or more processors via the one or more memories to implement the methods or processes of the present disclosure.

The present disclosure describes a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
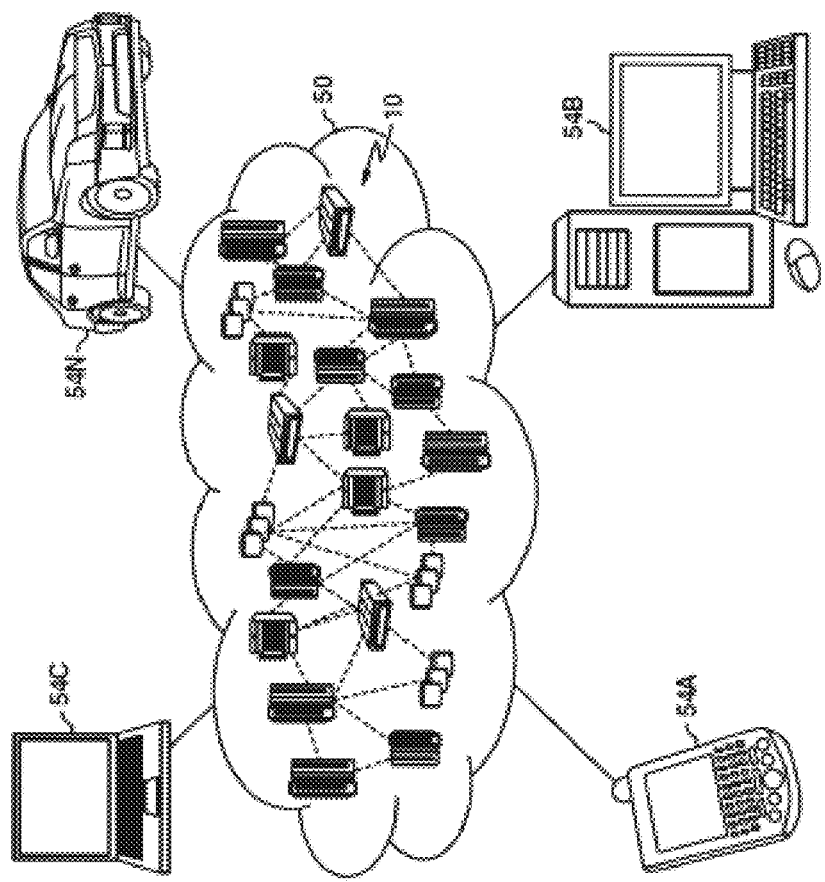
FIG. 6 depicts a cloud computing environment, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
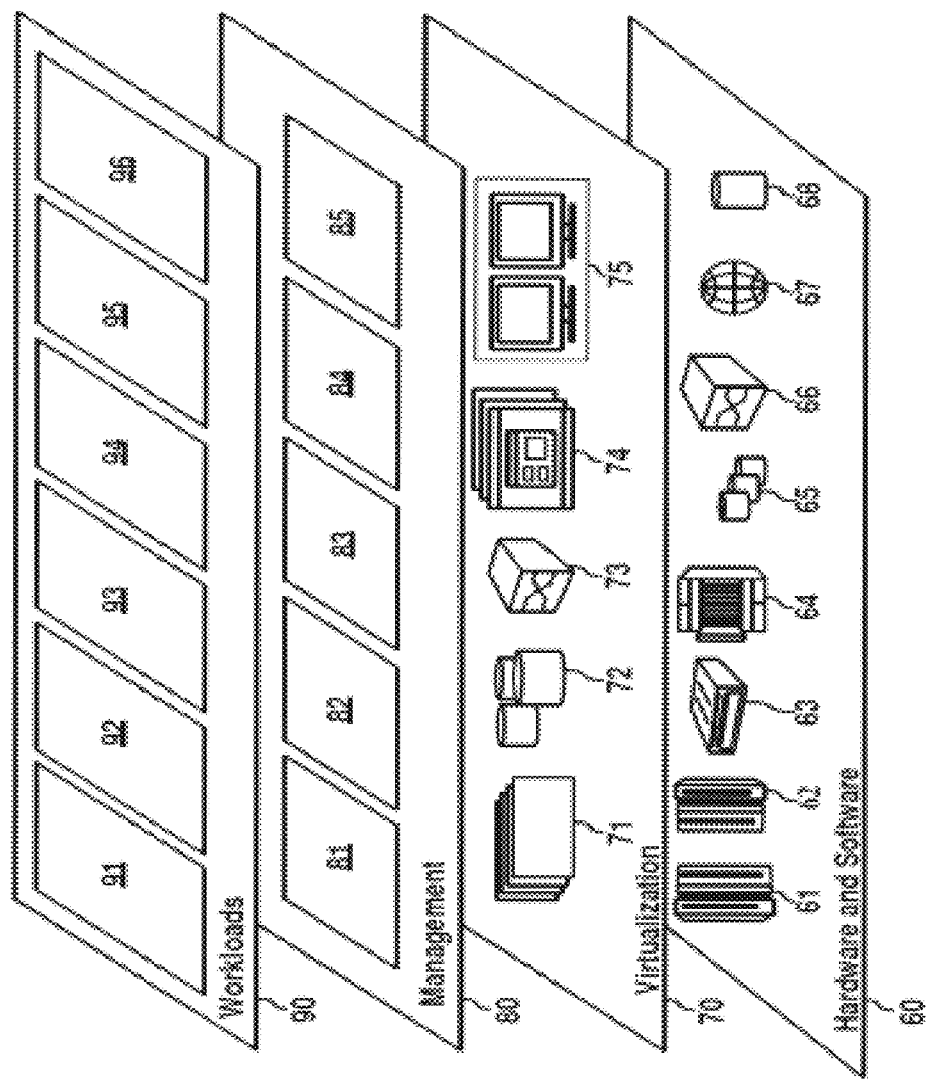
FIG. 7 depicts abstraction model layers, in accordance with embodiments of the present disclosure.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and calendar management for determining availability of an invitee 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for controlling a cursor, the method comprising:
   receiving a first input from a cursor control device that places a cursor in an engaged state to select a screen object;
   receiving an indication to switch from a gross cursor control mode to an engaged cursor control mode while the cursor is in the engaged state;
   in response to receiving the indication to switch from the gross cursor control mode to the engaged cursor control mode, switching from the gross cursor control mode to the engaged cursor control mode and (i) locking the cursor in the engaged state such that the cursor maintains the engaged state even after the first input from the cursor control device has terminated and (ii) locking the cursor control device such that only a keyboard may be used to move the selected screen object, wherein while the cursor is in the engaged state, the cursor is engaged on the selected screen object and the screen object remains selected and only the keyboard may be used to move the selected screen object; and
   in response to receiving a second input, performing an operation on the screen object while in the engaged cursor control mode and while the cursor is locked in the engaged state without having to reselect the screen object even after the first input from the cursor control device has terminated and moving the cursor at a more granular rate using one or more arrow keys of the keyboard while in the engaged cursor control mode and while the cursor is locked in the engaged state than the cursor would move while in the gross cursor control mode, wherein the more granular rate is user-configurable on a pixel basis.

2. The method of claim 1, further comprising:
in response to receiving a third input, switching from the engaged cursor control mode to the gross cursor control mode and unlocking the cursor from the engaged state.

3. The method of claim 1, wherein moving the cursor at the more granular rate in response to receiving the second input further comprises performing, at least in part, at least one of: a drag and drop operation, a scaling operation, a move operation, a highlight operation, a select operation, or a draw operation.

4. The method of claim 1, wherein the cursor control device is selected from the group consisting of: a track ball, a track pad, a stylus, a mouse, a pointer device, and an eye tracking device.

5. The method of claim 1, wherein a click operation initiates the first input that places the cursor in the engaged state and, when in the engaged cursor control mode, the cursor remains in the engaged state even when the click operation has terminated.

6. The method of claim 1, wherein said moving the cursor at the more granular rate using the one or more arrow keys of the keyboard while in the engaged cursor control mode and while the cursor is locked in the engaged state comprises moving the object at distances less than a pixel.

7. A computer system for controlling a cursor, comprising:
a processor;
a memory device coupled to the processor; and
a computer readable storage device coupled to the processor, wherein the storage device contains program code executable by the processor via the memory device to implement a method for controlling the cursor, the method comprising:
receiving, by the processor, a first input from a cursor control device that places a cursor in an engaged state to select a screen object;
receiving, by the processor, an indication to switch from a gross cursor control mode to an engaged cursor control mode while the cursor is in the engaged state;
in response to receiving the indication to switch from the gross cursor control mode to the engaged cursor control mode, switching from the gross cursor control mode to the engaged cursor control mode and (i) locking the cursor in the engaged state such that the cursor maintains the engaged state even after the first input from the cursor control device has terminated and (ii) locking the cursor control device such that only a keyboard may be used to move the selected screen object, wherein while the cursor is in the engaged state the cursor is engaged on the selected screen object and the screen object remains selected and only the keyboard may be used to move the selected screen object; and
in response to receiving a second input, performing, by the processor, an operation on the screen object while in the engaged cursor control mode and while the cursor is locked in the engaged state without having to reselect the screen object even after the first input from the cursor control device has terminated and moving the cursor at a more granular rate while in the engaged cursor control mode and while the cursor is locked in the engaged state than the cursor would move while in the gross cursor control mode, wherein the more granular rate is user-configurable on a pixel basis.

8. The computer system of claim 7, further comprising:
in response to receiving a third input, switching from the engaged cursor control mode to the gross cursor control mode and unlocking the cursor from the engaged state.

9. The computer system of claim 7, wherein moving the cursor at the more granular rate in response to receiving the second input further comprises performing, at least in part, at least one of: a drag and drop operation, a scaling operation, a move operation, a highlight operation, a select operation, or a draw operation.

10. The computer system of claim 7, wherein the cursor control device is selected from the group consisting of: a track ball, a track pad, a stylus, a mouse, a pointer device, and an eye tracking device.

11. The computer system of claim 7, wherein a click operation initiates the first input that places the cursor in the engaged state and, when in the engaged cursor control mode, the cursor remains in the engaged state even when the click operation has terminated.

12. The computer system of claim 7, wherein said moving the cursor at the more granular rate using the one or more arrow keys of the keyboard while in the engaged cursor control mode and while the cursor is locked in the engaged state comprises moving the object at distances less than a pixel.

13. A computer program product, comprising a computer readable hardware storage device storing a computer readable program code, the computer readable program code comprising an algorithm that when executed by a computer processor of a computing system implements a method for controlling a cursor, comprising:
receiving, by the processor, a first input from a cursor control device that places a cursor in an engaged state to select a screen object;
receiving, by the processor, an indication to switch from a gross cursor control mode to an engaged cursor control mode while the cursor is in the engaged state;
in response to receiving the indication to switch from the gross cursor control mode to the engaged cursor control mode, switching from the gross cursor control mode to the engaged cursor control mode and (i) locking the cursor in the engaged state such that the cursor maintains the engaged state even after the first input from the cursor control device has terminated and (ii) locking the cursor control device such that only a keyboard may be used to move the selected screen object, wherein while the cursor is in the engaged state, the cursor is engaged on the selected screen object and the screen object remains selected and only the keyboard may be used to move the selected screen object; and
in response to receiving a second input, performing, by the processor, an operation on the screen object while in the engaged cursor control mode and while the cursor is locked in the engaged state without having to reselect the screen object even after the first input from the cursor control device has terminated and moving the cursor at a more granular rate while in the engaged cursor control mode and while the cursor is locked in the engaged state than the cursor would move while in the gross cursor control mode, wherein the more granular rate is user-configurable on a pixel basis.

14. The computer program product of claim 13, further comprising:

in response to receiving a third input, switching from the engaged cursor control mode to the gross cursor control mode and unlocking the cursor from the engaged state.

15. The computer program product of claim 13, wherein moving the cursor at the more granular rate in response to receiving the second input further comprises performing, at least in part, at least one of: a drag and drop operation, a scaling operation, a move operation, a highlight operation, a select operation, or a draw operation.

16. The computer program product of claim 13, wherein the cursor control device is selected from the group consisting of: a track ball, a track pad, a stylus, a mouse, a pointer device, and an eye tracking device.

17. The computer program product of claim 13, wherein said moving the cursor at the more granular rate using the one or more arrow keys of the keyboard while in the engaged cursor control mode and while the cursor is locked in the engaged state comprises moving the object at distances less than a pixel.

\* \* \* \* \*